United States Patent [19]
Kitani et al.

[11] Patent Number: 5,579,214
[45] Date of Patent: Nov. 26, 1996

[54] HALF-WAVE RECTIFIER CIRCUIT

[75] Inventors: Kazuhiro Kitani; Yuji Segawa; Kunihiko Gotoh, all of Kawasaki, Japan

[73] Assignee: Fujitsu Limited, Kanagawa, Japan

[21] Appl. No.: 332,299

[22] Filed: Oct. 31, 1994

[30] Foreign Application Priority Data

Dec. 28, 1993 [JP] Japan ................................ 5-335661

[51] Int. Cl.$^6$ ........................................ H02M 1/12
[52] U.S. Cl. ................................. 363/44; 363/127
[58] Field of Search ..................... 363/44, 45, 46, 363/125, 126, 127, 81, 84

[56] References Cited

U.S. PATENT DOCUMENTS

| | | | |
|---|---|---|---|
| 4,855,890 | 8/1989 | Kammiller | 363/44 |
| 4,872,127 | 10/1989 | Nolan | 363/45 X |
| 4,992,921 | 2/1991 | Albach et al. | 363/44 |
| 5,121,316 | 6/1992 | Rensink et al. | 363/44 X |

*Primary Examiner*—Peter S. Wong
*Assistant Examiner*—Y. J. Han
*Attorney, Agent, or Firm*—Nikaido Marmelstein Murray & Oram LLP

[57] ABSTRACT

In a half-wave rectifier circuit for obtaining an DC voltage output depending on the level of an input signal through half-wave rectification of the input signal, an input voltage from which a DC component is removed by a capacitor is input to a switch circuit. This input voltage includes an offset voltage which is generated by use of the capacitor. The switch circuit outputs a half-wave rectified voltage to a smoothing circuit by switching the input voltage ON and OFF depending on the polarity of the input signal. Under the condition that an input voltage is controlled to OFF state, the switch circuit shows a high impedance viewed from the input side of the smoothing circuit. Therefore, an output voltage of the smoothing circuit is maintained when the switch circuit is in the OFF state. Thereby, the offset voltage generated by the capacitor is eliminated from the output voltage from the smoothing circuit.

11 Claims, 7 Drawing Sheets

Fig. 1
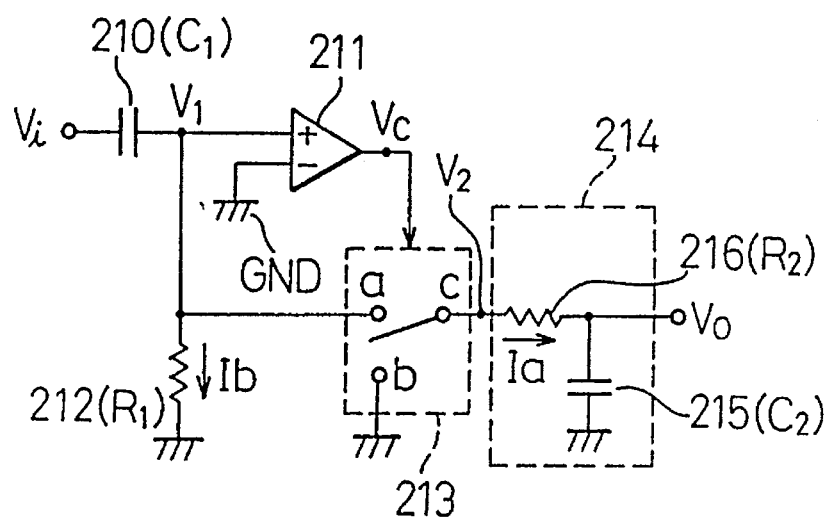
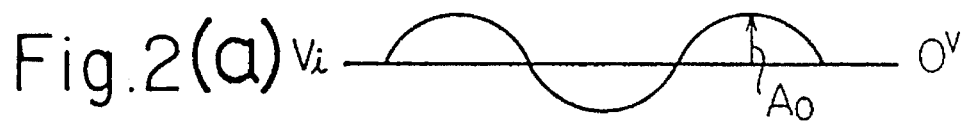
Fig. 2(a) $V_i$ — $A_0$, $0^V$
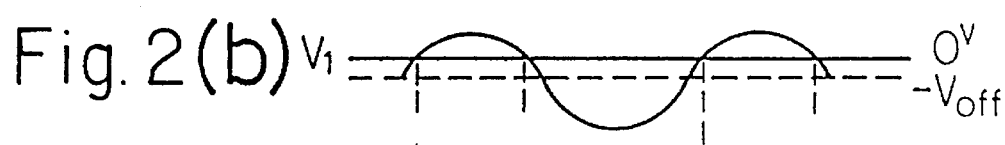
Fig. 2(b) $V_1$ — $0^V$, $-V_{off}$
Fig. 2(c) $V_c$ — H, L
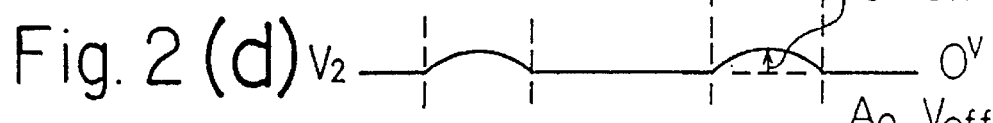
Fig. 2(d) $V_2$ — $A_0 - V_{off}$, $0^V$
Fig. 2(e) $V_0$ — $\dfrac{A_0}{\pi} - \dfrac{V_{off}}{2}$, $0^V$ Fig. 3
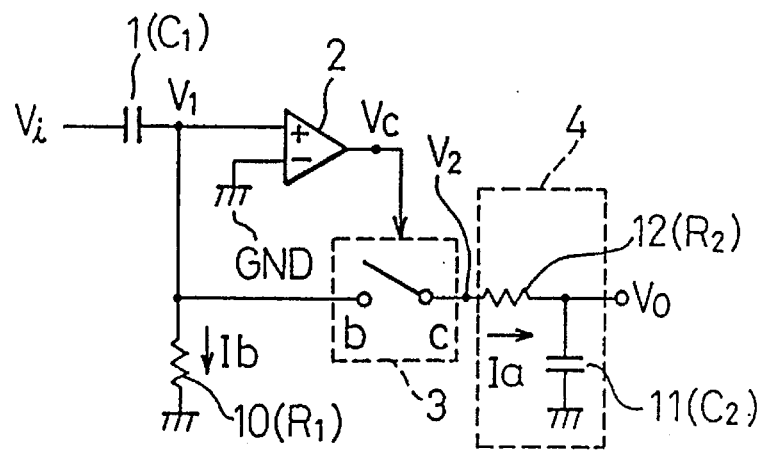
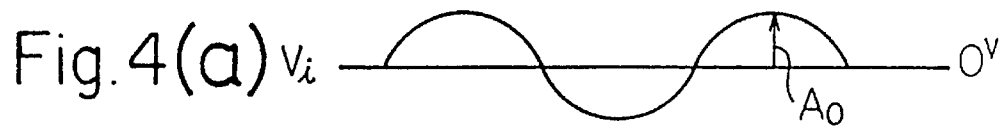
Fig. 4(a) $V_i$
Fig. 4(b) $V_1$
Fig. 4(c) $V_c$
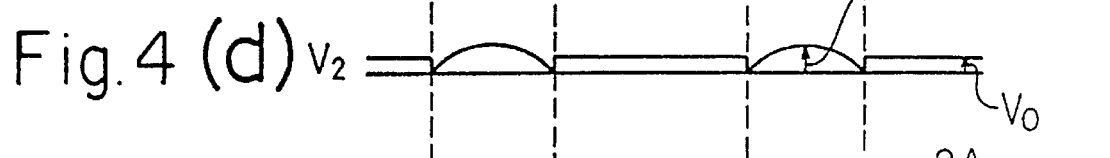
Fig. 4(d) $V_2$
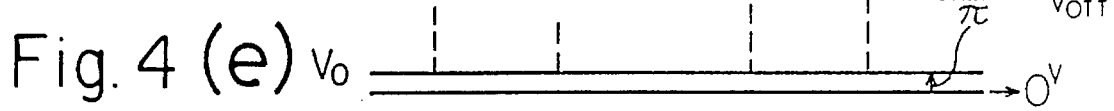
Fig. 4(e) $V_o$

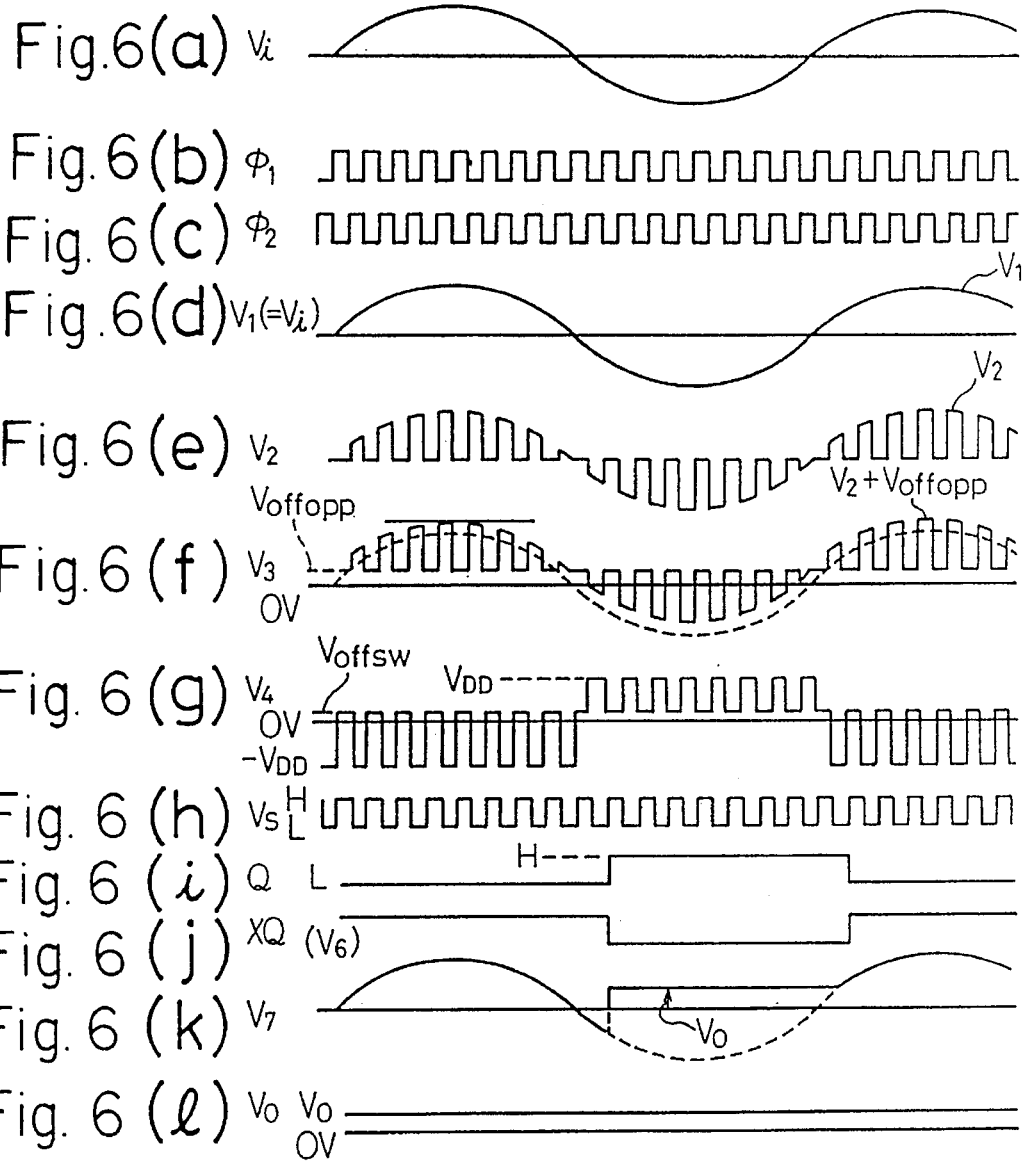

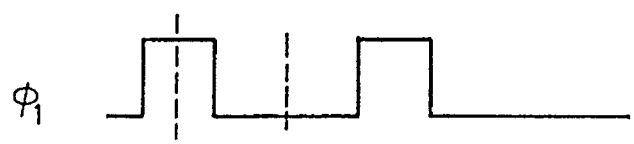
Fig. 7(a)
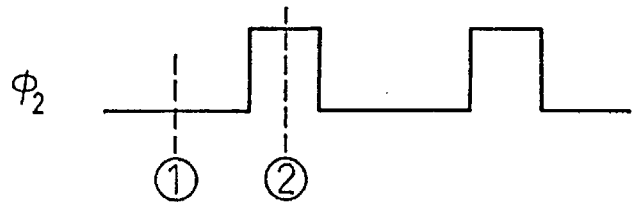
Fig. 7(b)
Fig. 8
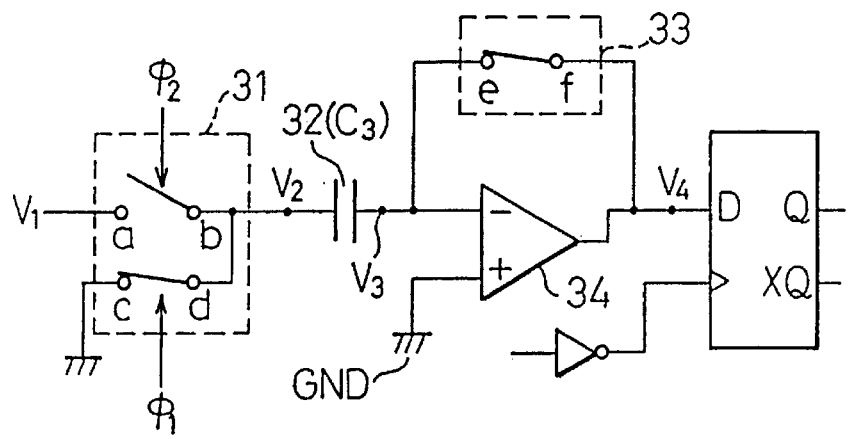
Fig. 9
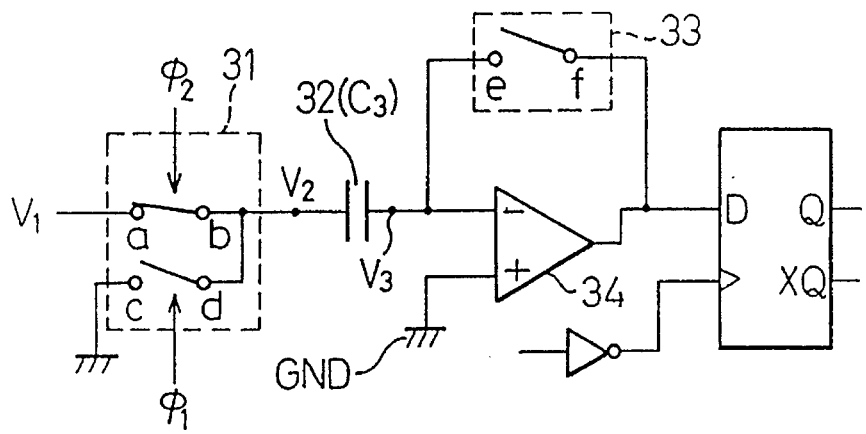

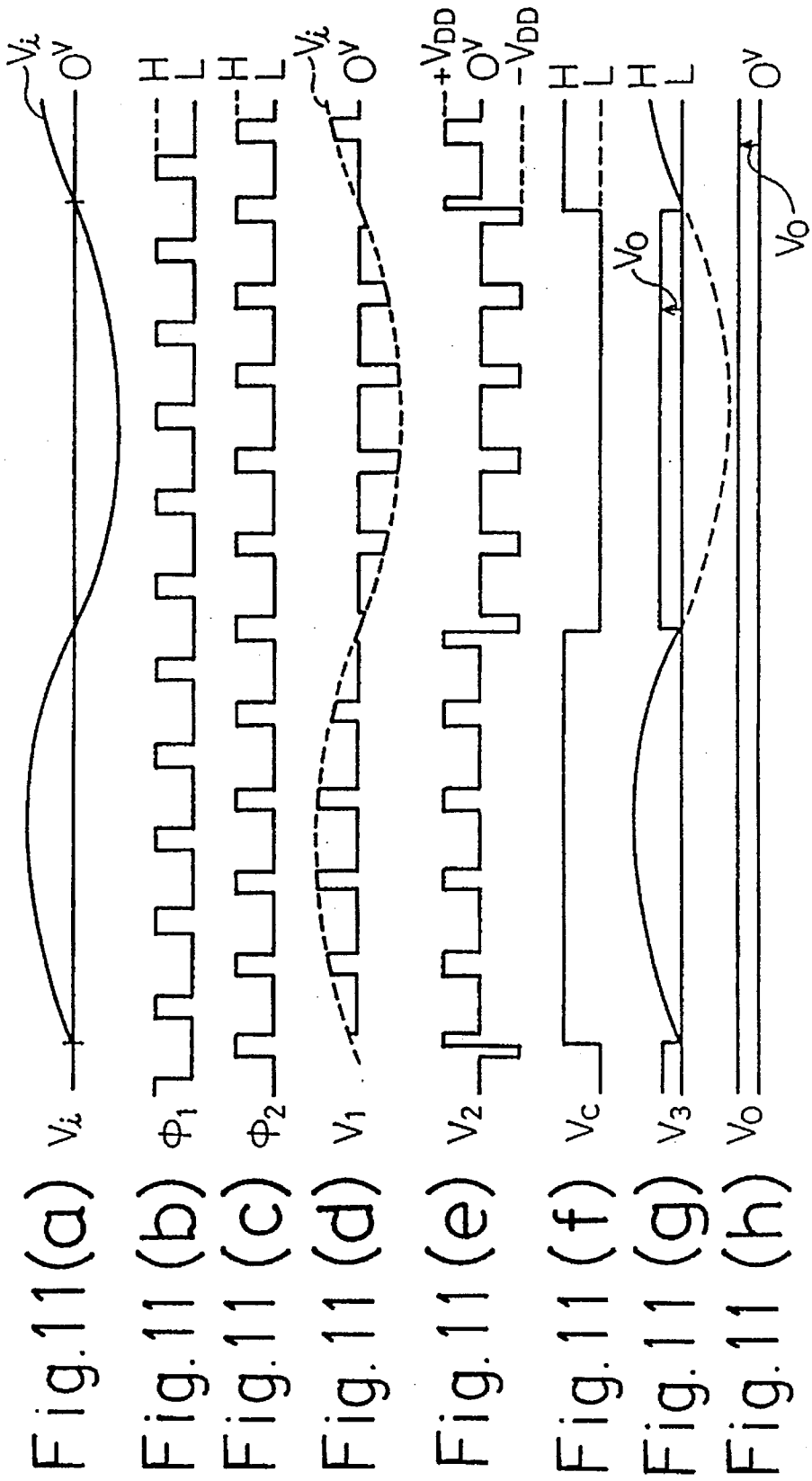

HALF-WAVE RECTIFIER CIRCUIT

BACKGROUND OF THE INVENTION

1. Field of the Invention

The present invention relates to a half-wave rectifier circuit for obtaining a DC voltage depending on the level of an AC input signal. A circuit for adjusting an output depending on an AC input signal level, such as a compander (compressor/expander) or ALC, etc., requires a half-wave rectifier circuit for obtaining a DC voltage depending on an AC input level.

Such half-wave rectifier circuit receives an input signal via a coupling capacitor in order to remove any DC component in the input signal. The use of this capacitor results in the generation of an offset voltage, an error in the output of the half-wave rectifier circuit. When the input signal is a low level signal, the error becomes relatively large. Therefore, a half-wave rectifier circuit in which the offset voltage generated by a coupling capacitor does not influence the output is needed.

2. Description of the Related Art

In an existing half-wave rectifier circuit, an input AC signal voltage input via a capacitor to a comparator and a switch circuit. An output of the switch circuit is then supplied to a smoothing circuit. The comparator compares an input signal with the reference voltage and outputs a signal for driving the switch circuit depending on the polarity of the input signal. The switch circuit responds to the output of the comparator to connect the input signal to the smoothing circuit when the polarity of input signal is positive (+) or to the ground when the polarity is negative (−). As a result, a half-wave rectified voltage is output from the smoothing circuit.

In this existing half-wave rectifier circuit, an offset-voltage appears on the capacitor provided to remove any DC component in the input signal and the offset-voltage affects output voltage. Therefore, such existing half-wave rectifier circuit cannot provide an accurate smoothed output due to the influence by the offset voltage and particularly cannot provide an accurate output when the input level is small because the relative error between the signal voltage and the offset voltage becomes large.

SUMMARY OF THE INVENTION

It is therefore an object of the present invention to provide a half-wave rectifier circuit which produces a half-wave rectified output voltage without the effect of the offset voltage generated by a capacitor provided to remove DC components in the input signal and provides a highly accurate output voltage.

In view of achieving the object explained above, the present invention discloses a constitution of a half-wave rectifier circuit for obtaining a DC voltage output depending on the level of an input signal through half-wave rectification of the input signal, comprising a capacitor for removing a DC component in the input signal, a comparator for comparing the input signal from which any DC component is removed with a reference value and provides an output signal when one of the input signal or the reference value is larger than the other, a smoothing circuit for outputing an output of the half-wave rectifier circuit by smoothing an input signal and a switch circuit which receives the input signal from which a DC component is removed by the capacitor, turning ON or OFF the input signal depending on an output signal of the comparator, and which supplies the output signal thereof to the smoothing circuit wherein the smoothing circuit shows a high input impedance when the input signal is turned OFF.

In the half-wave rectifier circuit constituted as explained above, an input signal with a DC component removed by the capacitor becomes a signal which is the input signal reduced by offset voltage $V_{off}$. This signal is then passed to a comparator for comparison with the reference voltage to generate an output voltage. The switch circuit is turned ON or OFF, in response to the output voltage of comparator. When the switch circuit is in the ON state, an input signal is passed to the smoothing circuit. When the switch circuit is in the OFF state, the input impedance of the smoothing circuit becomes high, and an output voltage from the smoothing circuit is maintained. The smoothing circuit receives an input signal for a half-cycle and maintains the output voltage in another half cycle and thereby provides an output voltage which does not include the influence of the offset voltage.

Moreover, in the present invention, it is possible to obtain a half-wave rectifier circuit which removes the influence of offset voltage generated in the comparator. For this purpose, the comparator comprises an operational amplifier and a capacitor which is connected to an input terminal of the operational amplifier in order to accumulate electric charges depending on the offset voltage of the operational amplifier. Since this capacitor also eliminates the influence of offset voltage from the output voltage of the comparator, the half-wave rectifier circuit can provide a more accurate output voltage depending on the input signal.

BRIEF DESCRIPTION OF THE DRAWINGS

The above object and features of the present invention will be more apparent from the following description of the preferred embodiment with reference to the accompanying drawings, wherein:

FIG. 1 illustrates a circuit diagram of a half-wave rectifier circuit of the related art.

FIG. 2 is a time chart for explaining the operation of the half-wave rectifier circuit of FIG. 1.

FIG. 3 illustrates a circuit diagram of the basic constitution of the half-wave rectifier circuit of the present invention.

FIG. 4 is a time chart for explaining the operation of the half-wave rectifier circuit of FIG. 3.

FIG. 6 is a time chart of the half-wave rectifier circuit of FIG. 5.

FIG. 7 illustrates waveforms of control signals $\phi_1$ and $\phi_2$ for explaining the operation of the comparator used in the half-wave rectifier circuit of FIG. 5.

FIG. 8 indicates a state of comparator shown in FIG. 5 at the first time.

FIG. 9 indicates a state of comparator shown in FIG. 5 at the second time.

FIG. 11 is a time chart of the half-wave rectifier circuit shown in FIG. 10.

DESCRIPTION OF THE PREFERRED EMBODIMENTS

Figure 5:
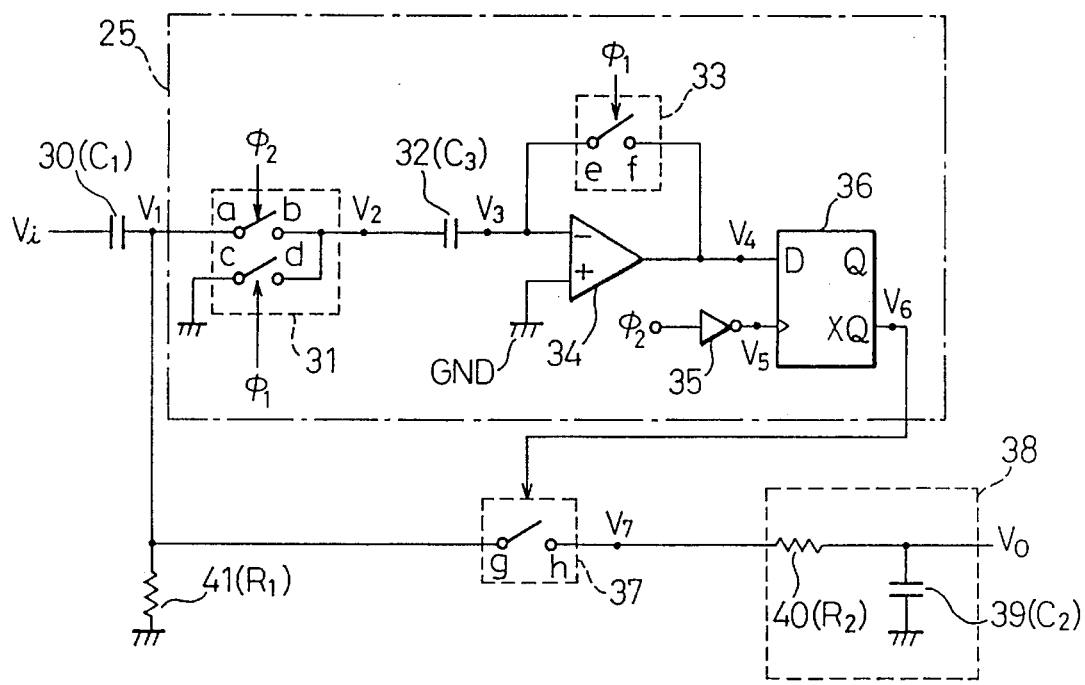
FIG. 5 illustrates a circuit diagram indicating, in detail, a comparator in the half-wave rectifier circuit of the present invention.

Before describing the embodiments of the present invention, the related art and the disadvantages therein will be described with reference to the related figures.

FIG. 1 illustrates a half-wave rectifier circuit of the related art.

In FIG. 1, the reference numeral 210 designates a capacitor $C_1$ which removes a DC component in an input signal $V_1$. Reference numeral 211 indicates a comparator formed using an operational amplifier for comparing the input voltage $V_1$ after the DC element is eliminated with the reference voltage GND. Reference numeral 212 indicates a resistor $R_1$ connected between the capacitor $C_1$ and the ground. Reference numeral 213 indicates a switch circuit composed, for example, of a switch element such as MOSFET, etc. which turns ON (conducts between terminals a and c) or OFF (conducts between terminals b and c), in response to an output $V_c$ of the comparator 211. Reference numeral 214 indicates a smoothing circuit for smoothing an output of the switch circuit 213. Reference numeral 215 indicates a capacitor $C_2$ connected between the output terminal and the ground, and reference numeral 216 indicates a resistor $R_2$ connected between the input and output terminals.

FIG. 2 is a time chart indicating the operation of the half-wave rectifier circuit shown in FIG. 1.

In FIG. 2, (a) shows a voltage $V_i$ of an input voltage. $A_o$ is the maximum amplitude of the input voltage $V_i$. (b) is a voltage $V_1$ obtained by cutting off the DC element from the voltage $V_i$ of the input signal with the capacitor $C_1$ and reducing the voltage $V_i$ by the offset voltage $V_{off}$. (c) is a voltage $V_c$ output from the comparator 211 as a control signal to the switch circuit 213. (d) is a voltage $V_2$ output from the switch circuit 213 where the maximum amplitude $A_o - V_{off}$ is half-wave rectified. (e) is an output voltage $V_o$ obtained by smoothing the voltage $V_2$, having an output level of $(A_o/\pi)-(V_{off}/2)$.

By referring to FIG. 2, the operation of the half-wave rectifier circuit of FIG. 1 will be explained hereunder.

Voltage $V_i$, the input signal with any DC element removed by the capacitor $C_1$, is offset by the voltage $V_{off}$ to become the signal $V_1$. The signal $V_1$ is input to the comparator 211 for comparison with the ground potential GND as the reference voltage to generate an output voltage $V_c$. The switch circuit 213 turns ON (conductive between terminals a and c, non conductive between terminals b and c) when $V_c$ is in the H level or OFF (non conductive between terminals a and c, conductive between terminals b and c) when $V_c$ is in the L level. Therefore, the input voltage $V_2$ to the smoothing circuit 214 changes to $V_1$ when $V_c$ is in the H level or to the ground potential GND when $V_c$ is in the H level. As a result, the half-wave rectified voltage $V_2$ shown as (d) is then input to the smoothing circuit 214.

In the smoothing circuit 214, when the switch circuit 213 is in the ON state, a current flows into the capacitor $C_2$ via the resistor $R_2$ and when the switch circuit 213 is in the OFF state a current flows into the ground side from the capacitor $C_2$ via the resistor $R_2$, providing an output voltage $V_o$ of the smoothing circuit 214. In this case, the influence of the offset voltage $V_{off}$ appears on the output voltage $V_o$ expressed as $(A_o/\pi)-(V_{off}/2)$.

The offset voltage $V_{off}$ of the half-wave rectifier circuit of the related art is expressed as follow.

$$V_i = A_0 \sin\theta$$
$$V_0 = \frac{1}{2\pi} \int_0^\pi (A_0 \sin\theta - V_{off}) d\theta$$
$$= \frac{A_0}{\pi} - \frac{V_{off}}{2}$$

Here, when a current flowing through the resistor $R_2$ is $I_a$ and a current flowing through the resistor $R_1$ is $I_b$, following relations can be obtained.

$$I_a = (V_1 - V_o)/R_2, \quad I_b = V_1/R_1$$

When a total current is I, $$I = \int_o^\pi \frac{V_1 - V_0}{R_2} d\theta + \int_0^{2\pi} \frac{V_1}{R_1} d\theta$$

$$= \int_0^\pi \frac{A_0 \sin\theta - V_{off} - \left(\frac{A_0}{\pi} - \frac{V_{off}}{2}\right)}{R_2} d\theta +$$

$$\int_0^{2\pi} \frac{A_0 \sin\theta - V_{off}}{R_1} d\theta$$

$$= \frac{A_0}{R_2} - \frac{\pi V_{off}}{2R_2} - \frac{2\pi V_{off}}{R_1}$$

Here, a value of $V_{off}$ which results in I=0 can be obtained as follows.

$$V_{off} = 2R_1 A_o/(\pi(R_1 + 4R_2))$$

Therefore, the half-wave rectifier circuit of the related art cannot provide an accurate smoothing output due to the influence of the offset voltage generated by the capacitor $C_1$. Particularly when an input level is small, the relative difference between the signal voltage and offset voltage becomes large and thereby an accurate output cannot be obtained.

FIG. 3 illustrates a circuit diagram of the basic constitution of the half-wave rectifier circuit of the present invention.

In FIG. 3, the reference numeral 1 designates a capacitor $C_1$ which is inserted to remove a DC element of the voltage $V_i$ of an input signal; reference numeral 2 indicates a comparator composed of an operational amplifier for comparing the voltage $V_i$ with the ground potential GND of the reference voltage; reference numeral 3 indicates a switch circuit composed of a switching element such as MOSFET which turns ON (conductive between the terminals b and c) or turns OFF (non-conductive between the terminals b and c); reference numeral 10 indicates a resistor $R_1$ connected between the capacitor $C_1$ and the ground; reference numeral 4 indicates a smoothing circuit for smoothing an output of the switch circuit 3; reference numeral 11 indicates a capacitor $C_2$ connected between an output terminal and the ground; reference numeral 12 indicates a resistor $R_2$ connected between an input terminal and output terminal of the smoothing circuit.

FIG. 4 is a time chart indicating changes, with time, of voltages at respective points in the half-wave rectifier circuit shown in FIG. 3.

(a) is a voltage $V_i$ of an input signal having the maximum amplitude $A_o$. (b) is an input voltage $V_1$ of which DC element is removed by the capacitor $C_1$ and which is the input voltage $V_i$ reduced by the offset voltage $V_{off}$. (c) is a voltage $V_c$ output from the comparator 2 to be used as a control signal for the switch circuit 3. (d) is a voltage $V_2$ obtained by half-wave rectification of the input voltage $V_1$, at the output of the switch circuit 3. (e) is an output voltage $V_o$ obtained by smoothing the half-wave rectified voltage $V_2$.

In the time chart of FIG. 4, an offset voltage $V_{off}$ is indicated but this offset voltage $V_{off}$ of the present invention appears only in the transitional state and never appears in the normal state. The half-wave rectified voltage $V_2$ and the output voltage $V_o$ indicate when the offset voltage is generated in the transitional condition and when such an offset voltage is not generated.

Operations of the circuit shown in FIG. 3 will be explained hereunder.

The input signal voltage $V_i$ is removed the DC component by a capacitor $C_1$ and is reduced the offset voltage $V_{off}$. The voltage $V_1$ is input to the comparator 2 and resistor $R_1$. In the comparator 2, an input voltage $V_1$ is compared with the reference voltage GND to produce an output voltage $V_c$. The switch circuit 3 is turned ON or OFF in response to $V_c$. For instance, it turns ON with H level of $V_c$ or turns OFF with L level of $V_c$. When the switch circuit 3 turns ON, the terminals b and c conduct causing the input voltage $V_1$ to be input to the smoothing circuit 4. When the switch circuit 3 turns OFF, the voltage $V_1$ is not input to the smoothing circuit 4. In addition, when the switch circuit 3 is in the OFF state, the input side of the smoothing circuit 4 has a high impedance, allowing a voltage $V_2$ equal to the output voltage $V_o$, based on the electrical charges accumulated in the capacitor $C_2$, to appear. The voltage $V_2$ is smoothed through the resistor $R_2$ and capacitor $C_2$ to produce an output voltage $V_o$.

According to the basic constitution of the present invention, voltage $V_1$ of the input signal impressed via the capacitor $C_1$ loses the DC element and is reduced the offset voltage $V_{off}$ when the switch circuit 3 turns ON, but when the switch circuit 3 turns OFF, the output voltage $V_o$ is maintained. Therefore, since the output voltage $V_o$ obtained when the switch circuit 3 is in the OFF state is added, in terms of the waveform area, to the output voltage $V_o$ appearing when the switch circuit 3 is in the ON state, the smoothed output voltage $V_o$ becomes equal to the voltage obtained when the voltage $V_i$ of the input signal is half-wave rectified. That is, the output voltage $V_o$ works to compensate for voltage drop caused by the offset voltage $V_{off}$.

Strictly speaking, immediately after an input is impressed, a current flows toward the output $V_o$ side from the input $V_1$ side only when the switch circuit 3 turns ON first, an offset voltage is generated depending on the current, having an influence on the output voltage $V_o$. However, during the repetition of operations of the switch circuit 3, the offset voltage $V_{off}$ is reduced (the time chart of FIG. 4 indicates the condition when the offset voltage is generated).

According to the basic constitution of the present invention, elimination of the offset voltage from the smoothed output can be theoretically explained as shown below.

Here, $V_i = A_o \sin\theta$ $$V_0 = \frac{1}{2\pi} \int_0^\pi (A_0\sin\theta - V_{off})d\theta + \frac{1}{2\pi} \int_0^\pi V_o d\theta$$

$$\therefore V_o = (2A_o/\pi) - V_{off}$$

Here, a current flowing through the resistor $R_2$ is $I_1$, while a current flowing through the resistor $R_1$ is $I_b$.

In this case, $I_a = (V_1 - V_o)/R_2$, $I_b = V_1/R_1$
A total current I can be expressed as follow.

$$\begin{aligned} I &= \int_o^\pi \frac{V_1 - V_0}{R_2} d\theta + \int_0^{2\pi} \frac{V_1}{R_1} d\theta \\ &= \int_0^\pi \frac{A_0\sin\theta - V_{off} - \left(\frac{2A_0}{\pi} - V_{off}\right)}{R_2} d\theta + \\ &\quad \int_0^{2\pi} \frac{A_0\sin\theta - V_{off}}{R_1} d\theta \\ &= \frac{2\pi V_{off}}{R_2} \end{aligned}$$

Therefor, $V_{off}$ which makes O the total current (I=O) can be obtained as O ($V_{off}$=O).

FIG. 5 illustrates a half-wave rectifier circuit comprising an improved comparator of the present invention. In FIG. 5, the numeral 25 designates an offset cancel type comparator which generates a control signal for the switch circuit 37 to eliminate the influence of the offset voltage of the comparator/operational amplifier 34; reference numeral 30 indicates a capacitor $C_1$ for eliminating a DC element from the input signal $V_i$; reference numeral 31 indicates a switch circuit which turns ON the terminals c and d when the control signal $\phi_1$ is in the H state, turns OFF the terminals c and d when the control signal $\phi_1$ is in the L level, turns ON the terminals a and b when the control signal $\phi_2$ is in the H state and turns OFF the terminals a and b when the control signal $\phi_2$ is in the L state; reference numeral 32 indicates a capacitor $C_3$; reference numeral 33 indicates a switch circuit which makes ON the terminals e and f when $\phi_1$ is in the H state and makes OFF these terminals when $\phi_1$ is in the L state; reference numeral 34 indicates a comparator/operational amplifier which operates as an inverse amplifier or a comparator when the switch circuit 33 is in the ON or OFF state (hereinafter, it is called a comparator or an inverse amplifier depending on its application); reference numeral 35 indicates a NOT circuit for outputting the inverse of the control signal $\phi_2$; reference numeral 36 indicates a flip-flop for outputting signal of the terminal D when a clock input $V_s$ rises to the terminal Q, and outputting the NOT logic to the terminal XQ; reference numeral 37 indicates a switch circuit which turns ON or OFF the terminals g and h using an output voltage $V_6$ (XQ) of the flip-flop 36 as the control signal; reference numeral 38 indicates a smoothing circuit; reference numeral 39 indicates a capacitor $C_2$ connected between an output terminal and the ground; reference numeral 40 indicates a resistor $R_2$ connected between an input terminal and an output terminal; reference numeral 41 indicates a resistor $R_1$ connected between the capacitor $C_1$ and the ground.

FIG. 6 is a time chart of the half-wave rectifier circuit shown in FIG. 5.

(a) is an input voltage $V_i$. (b) is a control signal $\phi_1$ for controlling the switch circuits 31 and 33. (c) is a control signal $\phi_2$ (the inverse of the control signal $\phi_1$) to control the switch circuit 31. (d) is an input voltage $V_1$ at the output of the capacitor $C_1$. (e) is a voltage $V_2$ output from the switch circuit 31. (f) is a signal output from the capacitor $C_3$ (32), composed of the voltage $V_2$ with the offset voltage $V_{offopp}$ of the comparator/operational amplifier 34. (g) is a signal $V_4$ output from the comparator/operational amplifier 34. $V_{offsw}$ of the signal (g) is the offset voltage based on the gate capacitance of the switch elements of the switch circuits 31 and 33. Actually, this offset voltage can be neglected. (h) is an output $V_5$ of the NOT circuit 35 which is the inverse (equal to the logic of $\phi_1$) of the control signal $\phi_2$. (i) is an output at the terminal Q of the flip-flop 36. (j) is an output at the terminal XQ of the flip-flop 36. (k) is an output voltage $V_7$ of the switch circuit 37 which has been half-wave rectified by the switch circuit 37. (l) is an output voltage $V_o$ of the smoothing circuit 38.

Prior to explaining the operation of the constitution of FIG. 5, the offset cancel operation of the offset cancel type comparator 25 will be explained with reference to FIG. 7 to FIG. 9. In FIG. 7 to FIG. 9, elements like those in FIG. 5 are designated by like reference numerals.

FIG. 7 illustrates the control signals $\phi_1$ and $\phi_2$. FIG. 8 illustrates the condition of comparator 25 at the timing ① in FIG. 7 of the control signals $\phi_1$ and $\phi_2$. FIG. 9 illustrates the condition of comparator 25 at the timing ② in FIG. 7 of the control signal $\phi_1$ and $\phi_2$.

① When $\phi_1$=H, $\phi_2$=L:

In this case, the switch circuits 31, 33 are in the condition illustrated in FIG. 8. $V_2$ and $V_3$ can be expressed as follow.
$V_2$=GND, $V_3$=GND+$V_{offopp}$ $V_{offopp}$ is an offset voltage of the comparator/operational amplifier 34. Therefore, electrical charge of the capacitor $C_3$ can be expressed as follow.

$Q=C(V_2-V_3)$ (C is a capacitance value of the capacitor $C_3$).

An output voltage $V_4$ of the operational amplifier 34 is formed by the offset voltage $V_{offopp}$ of the amplifier 34 and an inverted voltage change impressed to the inverted input (negative) and therefore it is expressed as follows.

$V_4=V_{offopp}$+GND

② Next, when $\phi_1$=L, $\phi_2$=H:

In this case, the switch circuits 31, 33 are set as illustrated in FIG. 9.

Here, $V_2=V_1$ and this voltage changes only as much as $V_1$–GND. Therefore, $V_3$ can be exparessed as follow.

$V_3$=GND+$V_{offopp}$+($V_1$–GND)

In the operation ①, since the voltage across the capacitor $C_3$ is stabilized, amount of electrical charge accumulated in the capacitor $C_3$ can be fixed. When the voltage $V_2$ changes from this condition, the voltage $V_3$ changes in the same degree as $V_2$ and is then stabilized.

The amount of the charges Q can be expressed as follow.

$$Q=C[GND+(V_1-GND)-(GND+V_{offopp})+(V_1-GND)]$$

Since Q is fixed, the voltage V is also fixed. The comparator/operational amplifier 34 operates as a comparator since the switch circuit 33 turns OFF. The voltages to be compared are $V_3$ and GND.

Comparison formula is $-V_3$+GND+$V_{offopp}$.
Therefore, this comparison formula can be transformed as follows.

$$\begin{aligned}VCOM &= -V_3 + GND + V_{offopp}\\ &= -[GND + V_{offopp} + (V_1 - GND)] + GND + V_{offopp}\\ &= -V_1 + GND\end{aligned}$$

Therefore, the comparator/operational amplifier 34 allows a comparison which is free from the influence of the offset voltage $V_{offopp}$.

The operation of the half-wave rectifier circuit shown in FIG. 5 will be explained hereunder with reference to FIG. 6.

At the time when the control signal $\phi_2$ is at the H level, the voltage $V_i$ is impressed to the inverse input side (negative side) of the comparator/operational amplifier 34 through a capacitor $C_1$. When $\phi_2$=L and $\phi_1$=H, the comparator/operational amplifier 34 operates as an inverse amplifier. In this process, the signals $V_i$, $V_1$, $V_2$, $V_3$, are equal to the voltage $V_i$ of the input signal (a) shown in FIG. 6, the input voltage $V_i$ (d), the output voltage $V_2$ of the switch circuit 31, and the input voltage $V_3$ of the comparator/operational amplifier (f) respectively.

The comparator/operational amplifier 34 operates as a comparator or an inverse amplifier, depending on the control signals $\phi_1$, $\phi_2$, and outputs a voltage $V_4$(g). The output $V_4$ of the comparator/operational amplifier 34 is input to the input terminal D of the flip-flop 36, passed to the flip-flop 36 at the falling edge of the control signal $\phi_2$ and is then maintained until the fall time of the control signal $\phi_2$. In this case, the flip-flop 36 outputs the voltage $V_4$, which has been fetched and maintained therein, to the terminal Q and also outputs its inverse to the terminal XQ($V_6$). In the process explained above, the control signal $V_6$ can be obtained.

Since the control signal $V_6$ has been obtained after comparing the input signal voltage $V_i$ with the reference value GND and has an accurate level, an accurate time for rectifying operation, by the switch circuit 37, can be obtained. The control signal $V_6$ is used as the control clock of the switch circuit 37, the input voltage $V_i$ is half-wave rectified by the switch circuit 37 and a half-wave rectified voltage $V_7$ is output from the switch circuit 37. The half-wave rectified voltage $V_7$ is input to the smoothing circuit 38 to provide the smoothed output $V_o$.

According to the preffered embodiment of the present invention, not only is the smoothed output $V_o$ of the smoothing circuit 38 free from the influence of the offset voltage generated by the capacitor $C_1$ used for removing the DC component but also the control signal $V_6$ for controlling the switch circuit 37 is free from the influence of the offset voltage of the comparator/operational amplifier 34. Therefore, half-wave rectifying operation can be realized with accurate timing and the output voltage $V_o$ of the smoothing circuit is accurately determined depending on the amplitude of the input voltage $V_i$.

Figure 10:
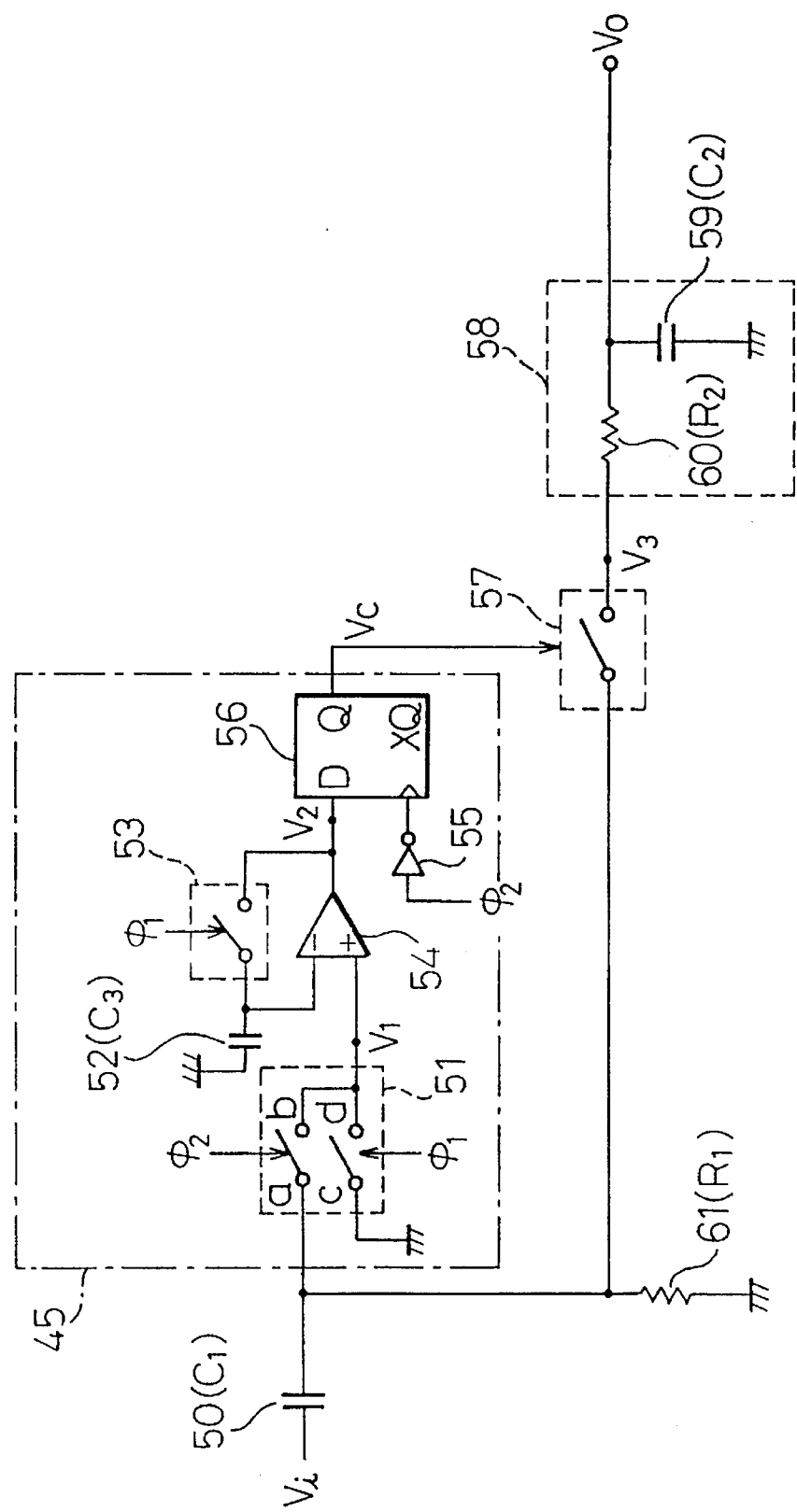
FIG. 10 illustrates a second embodiment of the half-wave rectifier circuit of the present invention.

FIG. 10 is a circuit diagram of the half-wave rectifier circuit including the second improved comparator.

In FIG. 10, the reference numeral 45 is an offset cancel type comparator; reference numeral 50 indicates a capacitor $C_1$ for eliminating a DC element; reference numeral 51 indicates a switch circuit; reference numeral 52, indicates a capacitor $C_3$; reference numeral 53 indicates a switch circuit; reference numeral 54 indicates a comparator/operational amplifier which operates as a comparator or voltage follower type operational amplifier (positive operational amplifier); reference numeral 55 indicates a NOT circuit; reference numeral 56 indicates a flip-flop; reference numeral 57 indicates a switch circuit; reference numeral 58 indicates a smoothing circuit; reference numeral 59 indicates a capacitor $C_2$; reference numeral 60 indicates a resistor $R_2$; reference numeral 61 indicates a resistor $R_1$.

FIG. 11 is a time chart of the half-wave rectifier circuit shown in FIG. 10. In FIG. 11, (a) is an input voltage $V_1$. (b) is a control signal $\phi_1$ for controlling the switch circuits 51, 52. (c) is a control signal $\phi_2$ for controlling the switch circuit 51. (d) is an output voltage $V_1$ of the switch circuit 51. (e) is an output voltage $V_2$ of the comparator/operational amplifier 54. (f) is an output voltage $V_c$ of output Q of the flip-flop 56. (g) is an output voltage $V_3$ of the switch circuit 57 obtained by half-wave rectification of the voltage $V_i$ output from the capacitor $C_1$. (h) is an output voltage $V_o$ of the smoothing circuit 58 obtained by smoothing the half-wave rectified voltage $V_3$.

Operations of the half-wave rectifier circuit illustrated in FIG. 10 will then be explained hereunder (with reference to FIG. 11, as required).

In the constitution of FIG. 10, when the control signal $\phi_1$ is at the H level, the terminals c and d of the switch circuit 51 turn ON and connect the voltage $V_1$ to the ground. In this case, the switch circuit 53 turns ON and the comparator/operational amplifier 54 operates as a voltage follower type operational amplifier to charge the capacitor $C_3$ with the offset voltage of the operational amplifier 54. When $\phi_2$=H, terminals a and b of the switch circuit 51 are connected, the signal $V_1$ is input to the comparator/operational amplifier 54 and this voltage $V_1$ is compared with the offset voltage $V_{offopp}$ maintained in the capacitor $C_3$ (52). Therefore, the offset can be cancelled by the offset voltage of the comparator/operational amplifier 54 itself and the voltage of capacitor $C_3$, the input voltage $V_1$ is compared with the ground voltage GND as in the case where there is no offset voltage of the comparator and thereby the accurate output can be obtained from the comparator/operational amplifier 54.

Operations of the constitution shown in FIG. 10 are same as that of the circuit of FIG. 5, except for the operations explained above.

An input voltage $V_1$ is compared with the reference voltage in the comparator/operational amplifier 54 and an output $V_2$ thereof is input to the flip-flop 56 which provides an output voltage $V_c$ to the terminal Q, as a comparison result, in synchronization with the timing of the control signal $\phi_2$. The output voltage $V_c$ of the flip-flop 56 is used as the control signal of the switch circuit 57 to turn ON or OFF the switch circuit 57 in order to generate the output voltage $V_3$ obtained by half-wave rectification of the input voltage $V_i$. The half-wave rectified output voltage $V_3$ is smoothed by the resistor $R_2$ and capacitor $C_2$ to obtain the output voltage $V_o$.

According to the circuit illustrated in FIG. 10, as in circuit shown in FIG. 5, since the half-wave rectification is accurately carried out in such a manner that not only is the smoothed output $V_o$ of the smoothing circuit 58 free from the influence of the offset voltage generated by the capacitor $C_1$ but also the control signal $V_c$ for controlling the switch circuit 57 is free from the influence of the offset voltage of the comparator/operational amplifier 54, an output voltage $V_o$ of the smoothing circuit 58 is accurately obtained depending on the amplitude of the input voltage $V_i$.

According to the present invention, an offset voltage generated by the coupling capacitor $C_1$ at the input of a half-wave rectifier can be cancelled and a highly accurate half-wave rectified output can be obtained. Accordingly, an input level can be detected accurately even when the input voltage is at a low level.

We claim:

1. A half-wave rectifier circuit for obtaining a DC voltage output depending on an input signal level through half-wave rectification of the input signal, comprising:

a capacitor for removing a DC component included in an input signal;

a comparator for comparing the input signal from which a DC component is removed with the reference value and then outputting a signal when one is larger than the other;

a smoothing circuit for outputing said half-wave rectifier circuit by smoothing an input signal thereof; and a switch circuit which receives the input signal from which a DC component is removed, turning ON and OFF the input signal depending on an output signal of said comparator and which supplies the output signal thereof to said smoothing circuit, wherein said smoothing circuit shows a high input impedance when said input signal is turned OFF.

2. A half-wave rectifier circuit of claim 1, wherein said comparator comprises an operational amplifier having a grounded inverse input terminal, a non-inverse terminal to which an input signal is passed and an output terminal.

3. A half-wave rectifier circuit of claim 2, comprising a resistor connected between the input side of said switch circuit and the ground.

4. A half-wave rectifier circuit of claim 2, wherein said smoothing circuit comprising a resistor connected between the input and output sides and a capacitor connected between the output side and the ground.

5. A half-wave rectifier circuit of claim 1, wherein said comparator comprises an operational amplifier and a second capacitor connected to an input terminal of said operational amplifier to accumulate electrical charges based on the offset voltage of said operational amplifier.

6. A half-wave rectifier circuit of claim 1, wherein said comparator comprising an operational amplifier of which non-inverse input terminal is grounded, a second switch circuit connected between an output terminal of said operational amplifier and an inverse input terminal thereof, a third switch circuit connected to said capacitor for eliminating said DC element and a second capacitor connected between said third switch circuit and the inverse input terminal of said operational amplifier to accumulate electrical charges based on said offset voltage.

7. A half-wave rectifier circuit of claim 6, wherein said third switch circuit comprising a first switch connected between said capacitor for eliminating said DC element and said second capacitor for accumulating electric charges based on said offset voltage and a second switch connected between said second capacitor, for accumulating electric charges based on the offset voltage of said operational amplifier, and the ground.

8. A half-wave rectifier circuit of claim 6, wherein said comparator comprising a flip-flop circuit connected to said output terminal of said operational amplifier to provide an output after maintaining an input signal for a predetermined period or longer.

9. A half-wave rectifier circuit of claim 1, wherein said comparator comprises an operational amplifier, a second switch circuit connected between an output terminal and an inverse input terminal of said operational amplifier, a third switch circuit connected between said capacitor for removing the DC component and a non-inverse input terminal of said operational amplifier and a second capacitor connected between an inverse input terminal of said operational amplifier and the ground to accumulate electrical charges based on the offset voltage of said operational amplifier.

10. A half-wave rectifier circuit of claim 9, wherein said third switch circuit, comprising a first switch connected between said capacitor for removing the DC component and said non-inverse input terminal of said operational amplifier and a second switch connected between said non-inverse input terminal of said operational amplifier and the ground.

11. A half-wave rectifier circuit of claim 9, wherein said comparator, comprises a flip-flop circuit connected to said output terminal of said operational amplifier to provide an output after storing an input signal for a predetermined period or longer.

* * * * *